United States Patent [19]

Bacon

[11] 4,162,494
[45] Jul. 24, 1979

[54] METHOD AND APPARATUS FOR DISPLAYING RADAR VIDEO REGISTERED WITH COMPUTER GENERATED DATA ON A TELEVISION MONITOR

[75] Inventor: James R. Bacon, Erdenheim, Pa.

[73] Assignee: Burroughs Corporation, Detroit, Mich.

[21] Appl. No.: 900,871

[22] Filed: Apr. 28, 1978

[51] Int. Cl.² .......................... G01S 7/06; H04N 9/09
[52] U.S. Cl. .............................. 343/5 EM; 343/5CD; 358/50; 340/745; 340/795; 340/703
[58] Field of Search ....................... 343/5 CD, 5 EM; 340/701, 702, 705, 721, 795, 797, 745, 703; 358/81, 82, 41, 42, 43, 50

[56] References Cited

U.S. PATENT DOCUMENTS

| 2,506,127 | 5/1950 | Allen | 343/5 CD |
| 3,030,443 | 4/1962 | Groll et al. | 343/5 EM |
| 3,112,360 | 11/1963 | Gregg | 358/50 |
| 3,191,169 | 6/1965 | Schulman et al. | 343/5 EM |
| 3,522,463 | 8/1970 | Bishop | 343/5 CD |
| 3,652,786 | 3/1972 | Morishita | 358/50 |
| 3,718,751 | 2/1973 | Landre et al. | 358/50 |

Primary Examiner—Maynard R. Wilbur
Assistant Examiner—Lawrence Goodwin
Attorney, Agent, or Firm—Francis A. Varallo; Edmund M. Chung; Kevin R. Peterson

[57] ABSTRACT

A method and apparatus for use in air-traffic control are described for maintaining substantial registration alignment between radar video signals and associated computer generated data on a television monitor. It is a requirement of the monitor display that the radar video, such as raw radar, map video, etc., be displayed with a long time constant to show the history of the radar trails. Simultaneously, the associated computer generated data, such as vectors, alpha-numerics, etc., must be displayed properly registered with the radar video on the same monitor with a short time constant. This is necessary to avoid smearing, since the latter data moves on the monitor screen as the radar pattern changes. In accordance with the present invention, the radar and computer data are combined into a single cathode ray tube, photographed by a pair of vidicons having different time lag characteristics, and the images of the latter combined on a television monitor.

8 Claims, 1 Drawing Figure

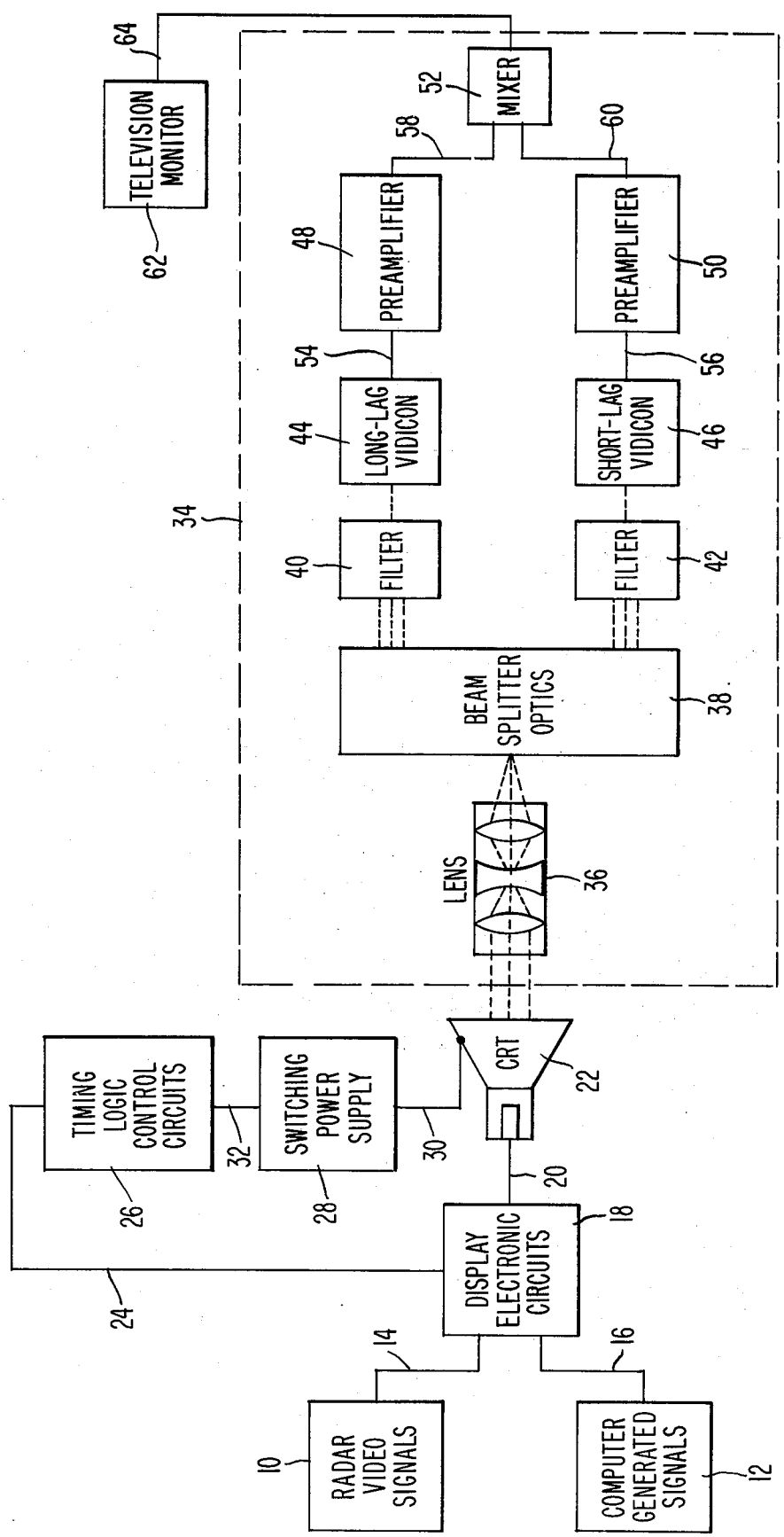

METHOD AND APPARATUS FOR DISPLAYING RADAR VIDEO REGISTERED WITH COMPUTER GENERATED DATA ON A TELEVISION MONITOR

BACKGROUND OF THE INVENTION

In present day air-traffic control operations, the airport radar installation provides for a PPI display in a special darkened room. This is necessary because the PPI presentation is relatively dim and the phosphor of the fairly large display tube is required to maintain a given trace at least until the next succeeding radar return, to provide a history of radar trails. The radar information must be supplied to the brightly illuminated airport tower cab. To accomplish this, the PPI information is applied to a small cathode ray tube having a short persistence phosphor. The display on the tube face is then photographed by a television camera having a long-lag vidicon. The long time delay characteristic of the latter provides the data retention not present in the small cathode ray tube. The television camera output is applied to a very bright television monitor located in the tower cab.

More recently, air-traffic control authorities have required that the computer generated data associated with the radar trails, such as the alpha-numeric tags which identify the aircraft, its flight number, altitude, etc., should also be displayed on the same tower cab television monitor, properly registered with the PPI information with which it is associated. Obviously to be useful, the registration of the data specified to be within a small percentage of the monitor screen diameter, must be rigidly maintained. A method being employed to provide this composite monitor information, involves the use of a second small cathode ray tube, similar to, but isolated from the first mentioned small tube, and the display on this tube of only the computer generated data, e.g. the above-mentioned alpha-numeric tags. The display on this second small tube is then photographed by a second television camera, similar to the first but having a standard (short decay) vidicon in place of the special long-lag vidicon. This short-decay vidicon characteristic provides the non-smearing display of the computer data as it keeps pace with the radar trails. The images from the two television cameras are then combined by appropriate electronic circuits and applied simultaneously to the television monitor. A composite display is thus generated.

A serious problem exists in the system just described, namely, the inability to maintain registration of the radar video and alpha-numerics to within a reasonable specification. This difficulty results because the information displayed is provided by respective substantially independent subsystems. More specifically, one subsystem must account for the PPI deflection system and the analog circuits which interface with it, the characteristics of the small cathode ray tube it uses and the television camera with its long-lag vidicon. The other subsystem also includes a small cathode ray tube in the deflection system associated with the computer generated data, and a television camera with a standard vidicon. In actual practice, the alignment of the former subsystem alone for displaying only radar video has proved to be difficult. The alignment of the combined subsystems to within a specified limit, and the maintenance of this alignment over a period of time and under different service conditions is virtually an impossibility. For example, after an alignment procedure, registration which is within specification immediately, may be well out-of-specification when checked a relatively short time later. Moreover, during operation it is sometimes necessary to change the expansions of the data being displayed, that is, change the size of the display on the screen, which also entails a change in the display centering. Once registration has been accomplished between the two subsystems, it becomes very complicated to maintain it when manipulating settings for gain and offset changes.

What is needed for air-traffic control operations is a system which is uncomplicated, more economical and relatively free of the alignment and registration problems inherent in the above-described equipment. The present invention fills such a need.

SUMMARY OF THE INVENTION

In accordance with a preferred embodiment of the invention, the registration and alignment problems described hereinbefore, are solved by initially providing increased commonality in the radar video and computer generated signals. More specifically, a signal composed of time-shared PPI radar video and computer data is applied to a beam penetration type phosphor cathode ray tube. In such a tube, the anode voltage thereof present upon the application of a signal thereto determines the color of the displayed signal. For example, if the cathode ray tube is adapted to provide red and green displays, the anode voltage may be switched to a high value when the radar video is applied to the tube, thereby resulting in a substantially green radar image. Assuming that the computer data is to be displayed in the radar "dead time", switching the tube anode to a low voltage at this time, causes the computer data, such as the alpha-numerics to have a red image. At any given time, the observer sees all the PPI information in green and the alpha-numeric information in red, both being in substantially perfect registration with each other. It should be understood that red and green have been chosen in the present example for ease of separation, but that a penetration phosphor using other colors could be used.

A television camera is positioned in proximity to the cathode ray tube and its lens is focused upon the red/green display. Beam splitter optics located behind the lens create two identical red/green displays physically separated into two paths or channels. Green and red filters are interposed in the two paths. The green filter substantially blocks the red image while passing the green image. The red filter performs the converse. A pair of vidicons are provided to intercept the respective images emerging from the filters. The vidicon associated with the green filter is of the special long-lag type to generate radar trail information; the vidicon adjacent the red filter is of the standard, short-lag type to handle the alpha-numeric data. The outputs of the two vidicons are combined and applied to the bright television monitor. Since registration in the television camera is normally high, the registration in the monitor is at least an order of magnitude better than that of the present day system described hereinbefore. Moreover, so long as the display is initially registered on the red/green cathode ray tube, the registration becomes dependent upon the camera itself, and is fixed for every scale, eliminating the problems associated with changes involving expansions of data and the size of the images being displayed.

These and other features of the invention will become more fully apparent in the detailed description of the system components and their method of operation, which follow.

BRIEF DESCRIPTION OF THE DRAWING

The drawing comprises a block diagram representation of the system of the present invention.

DESCRIPTION OF THE PREFERRED EMBODIMENT

The drawing illustrates the system organization of the present invention, which is comprised of three inter-related and cooperative sections. An input section includes a beam penetration type cathode ray tube for generating a multi-color display. A television camera and a monitor comprise intermediate and output sections respectively.

In the system input section, radar video signals 10 and computer generated signals 12 are applied in predetermined time relationship, via respective lines 14 and 16 to display electronic circuits 18. Actually the computer data is introduced into the system during the radar "dead time". In a manner known to those skilled in the display art, the latter circuits combine the input signals and provide a composite output signal comprised of time-shared PPI radar video and computer data. For example, in each millisecond interval, the radar data may occupy about 800 microseconds, and the next 200 microseconds is reserved for the computer generated data. This cycle is then repetitive. The composite signal on line 20 is applied to a beam penetration type cathode ray tube 22, which typically has a relatively small diameter screen of the order of 5 inches. The display electronic circuits 18 also generate electrical signals which are applied by way of line 24 to timing logic control circuits 26.

A switching power supply 28 is coupled via line 30 to the anode of the cathode ray tube 22. It is characteristic of this tube that it possesses a multi-layer phosphor screen and that the magnitude of the anode voltage at any given time determines the color of the displayed information at that time.

The function of the timing logic control circuits 26 is to generate, in response to the input signals supplied thereto on line 24, a series of output pulses on line 32 which are synchronized with the repetitive occurrences of the radar and computer signals. The output pulses on line 32 are applied to the switching power supply 28, causing the latter to supply at least two different sequential anode voltages to cathode ray tube 22. It will be assumed, for example, that the tube phosphors provide green and red displays in response to respective high (approximately 16 KV) and low (approximately 10 KV) voltage values. A pulse on line 32 indicative of the start of radar video may be used to trigger the power supply 28 to its high value, causing the radar video to appear substantially green on the face of the tube, with a negligible red component. Subsequently, during the next radar "dead time", a succeeding pulse on line 32 will cause power supply 28 to assume its low value, causing the computer derived data to appear as a red display, with virtually no green component. In this way, at any given time the observer will see all the radar PPI information in green and the computer alphanumerics in red on cathode ray tube 22. Moreover, the two forms of information are perfectly registered with each other on the common tube face.

The system intermediate section comprises a television camera 34, having a lens 36, beam splitter optics 38, green and red filters 40 and 42 respectively, long-lag and short-lag vidicons 44 and 46 respectively, a pair of preamplifiers 48 and 50, and a mixer 52.

In operation, the television camera 34 is positioned in proximity to cathode ray tube 22 and its lens 36 is focused upon the red/green display on the face of the tube. A beam splitter 38 is located behind the lens to create a pair of identical red/green displays physically separated from each other in respective paths or channels. A green filter 40 is placed in a first of the paths; a red filter 42, in the second path. The green filter 40 passes the green image of the radar video, while substantially blocking the red image of the computer data. Conversely, the red filter 42 will pass the red image of the computer data while suppressing the green radar information.

The long-lag vidicon 44 is placed in the first path to intercept the radar image emerging from the green filter 40. As noted hereinbefore, the long decay characteristic of this last mentioned vidicon produces the desired radar trail information. The short-lag, or standard vidicon 46 is interposed in the second path to receive the computer generated data emerging from the red filter 42. The characteristic of the short-lag vidicon is such that no smearing of the computer data will occur as the radar image moves. It should be noted that the short-lag vidicon 46 also senses the negligible red image component of the radar video mentioned hereinbefore but this signal component is so weak that no deleterious effects are produced.

The vidicons 44 and 46 are coupled via respective lines 54 and 56 to a pair of preamplifiers 48 and 50, which increase the gain of the signals therefrom. The amplified outputs of the preamplifiers are applied by way of lines 58 and 60 to a pair of respective inputs of a mixer 52.

The system output section includes a bright television monitor 62, typically having a screen diameter of about 14 inches adapted to operate with an anode voltage of approximately 25 KV. The radar video and computer signals from the vidicons 44 and 46 are combined in mixer 52 and applied as a composite signal via line 64 to television monitor 62, where they appear in registered alignment. Although not shown, it is to be assumed that sync and pedestal signals are also added into the composite signal as required in the usual manner for television cameras. As mentioned hereinbefore, the registration possible within the camera itself is very high, thereby ensuring that the original registration of the red/green display of cathode ray tube 22 is carried forward substantially unchanged to the final display on monitor 62.

In conclusion, the system described herein fills a basic need in the air-traffic control field, and does so in an efficient and reliable manner. The system is characterized by its utilization of known components, operated in a relatively simple, straightforward manner. It should be understood that changes and modification of the system may be needed to suit particular requirements. For example, while a red/green display has been selected for ease of separation, penetration phosphors using other colors may be used if desired. Also multi-level phosphors could be employed to produce more than a two color display, allowing three or four channel separation to be employed. In the television camera itself, the beam splitter and associated filters, could be replaced by dichroic optics. These and similar changes and modifications insofar as they are not departures from the true scope of the invention, are intended to be covered by the following claims.

What is claimed is:

1. A system for displaying on a television monitor registered signals derived respectively from time-shared radar video signals and computer generated signals comprising:

a cathode ray tube capable of displaying images in at least two colors, said time-shared radar video signals and said computer generated signals being imaged by said cathode ray tube in respective first and second colors, a television camera positioned in proximity to said cathode ray tube for photographing the two-color display imaged thereon, said television camera including optical means for deriving from said two-color display, a pair of displays physically separated into two paths and exhibiting respectively said first and second colors, a long-lag vidicon interposed in one of said paths to sense the images of said radar video signals appearing in the first color and a short-lag vidicon interposed in the other of said paths to sense the images of said computer data signals appearing in the second color, and means coupling the respective electrical outputs from said long-lag vidicon and short-lag vidicon in common to said television monitor.

2. A system as defined in claim 1 wherein said means coupling the electrical outputs from the vidicons to said television monitor include a pair of preamplifiers coupled respectively to said vidicons, a mixer having a pair of input terminals coupled respectively to said preamplifiers for receiving amplified outputs therefrom, said mixer having an output terminal coupled to said television monitor for supply thereto a composite signal comprised of radar video and computer data.

3. A system as defined in claim 2 wherein said television camera includes a lens for focusing upon the cathode ray tube two-color display, said optical means comprising a beam splitter situated behind said lens for producing identical two-color displays in said paths, and a pair of filter elements interposed respectively in said paths between said beam splitter and the pair of vidicons, to pass respective first and second color images to said vidicons.

4. A system as defined in claim 3 further characterized in that said computer generated signals appear in time-shared relationship with said radar video signals during the radar "dead time".

5. A system as defined in claim 4 further characterized in that said cathode ray tube is of the beam penetration type in which the colors of the displayed images are a function of respective different magnitudes of driving voltage applied thereto, switching power supply means coupled to said cathode ray tube and adapted to selectively provide said different magnitudes of driving voltage so as to cause said radar video signals and said computer generated signals to be imaged in said first and second colors respectively.

6. A system as defined in claim 5 wherein the phosphors of said cathode ray tube are capable of producing a red/green display, one of said filter elements being adapted to substantially pass those images displayed in green and to reject images displayed in red, the other of said filter elements providing a converse effect.

7. A method for displaying on a television monitor registered signals derived respectively from time-shared radar video signals and computer generated signals comprising the steps of:

displaying images of said radar video signals and said computer data signals on the screen of a cathode ray tube in respective first and second colors, photographing said screen and separating the two-color image display appearing thereon into a pair of identical two-color image displays, filtering out a different color image in each of the respective last mentioned pair of displays, sensing the images appearing in said first color with a long-lag vidicon and the images appearing in said second color with a short-lag vidicon, coupling the electrical outputs of the vidicons in common to said television monitor to provide a registered display of said time-shared signals.

8. A method as defined in claim 7 further including the steps of amplifying said electrical outputs from said vidicons and mixing the amplified outputs for generating a composite signal to be applied to said television monitor.

* * * * *